Jan. 23, 1962 J. E. MIKKELSON 3,018,094
GAS OR VAPOR TO LIQUID CONTACTING TRAY
Filed April 29, 1958
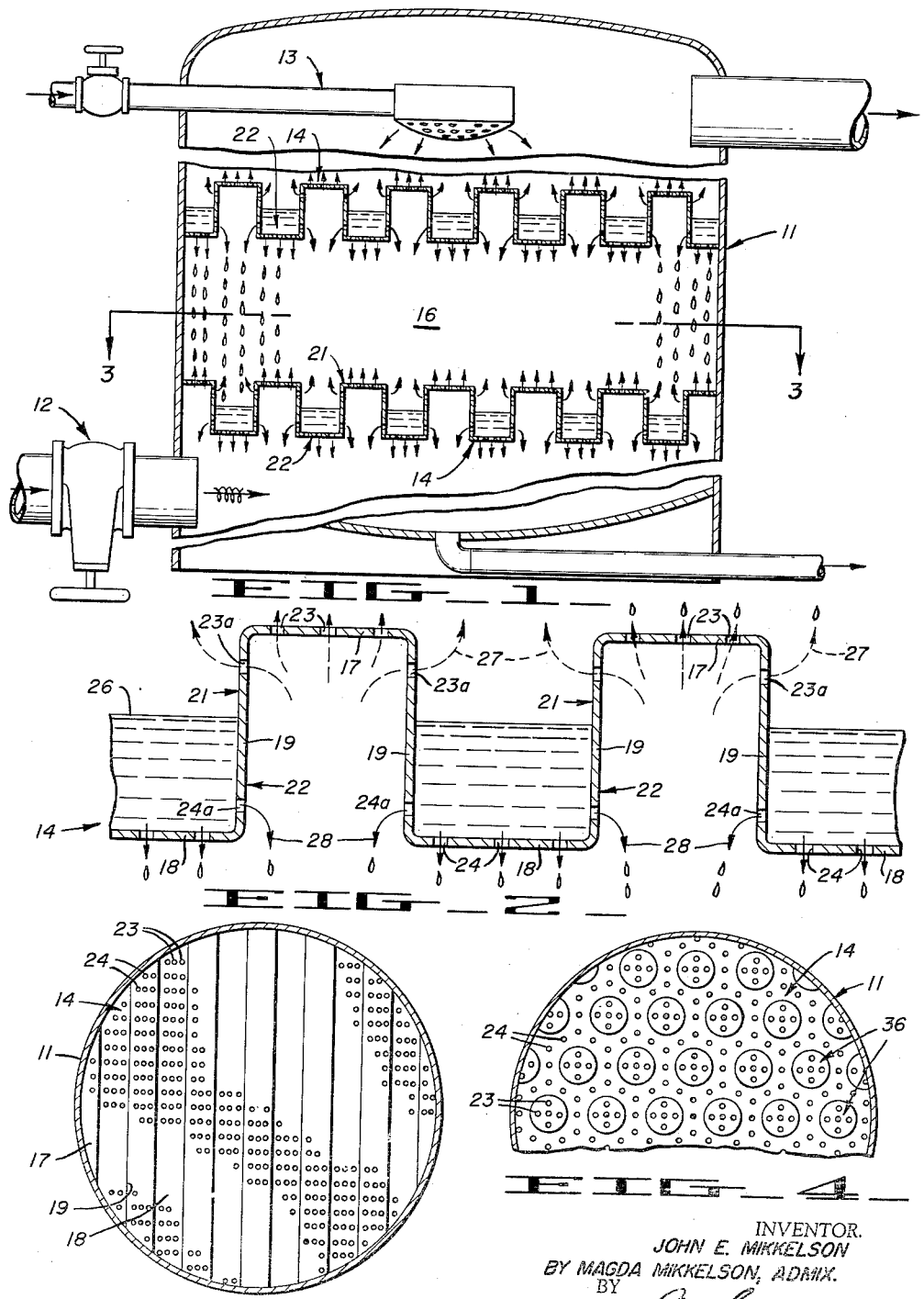
INVENTOR.
JOHN E. MIKKELSON
BY MAGDA MIKKELSON, ADMIX.
BY
ATTORNEY

3,018,094
GAS OR VAPOR TO LIQUID CONTACTING TRAY
John E. Mikkelson, deceased, late of 2295 Francisco St., San Franciso, Calif., by Magda Mikkelson, special administratrix, San Francisco, Calif.
Filed Apr. 29, 1958, Ser. No. 731,830
1 Claim. (Cl. 261—113)

This invention relates to a gas or vapor to liquid contacting tray, and involves an apparatus for effecting intimate contact of a gas or vapor with a liquid, and is particularly suited for use in fractionators, absorbers, strippers, coolers, humidifiers, and dehumidifiers.

In order to obtain optimum contacting action between a gas or vapor and a liquid, large surfaces areas of contact must be obtained. Such large surface areas may be provided by bubbling the vapor through the liquid in conventional bubble cap or sieve-type trays. Another method is to flow the liquid through a tower filled with packing having a large surface area, such as Raschig rings. A third method is to shower the liquid through the vapor.

The present invention is concerned with apparatus for performing the third method whereby a steady shower of tiny, discrete droplets or fine stream of the liquid is caused to drop downwardly through and scrub against upwardly directed currents of gas or vapor. By accomplishing a true countercurrent flow of liquid and vapor in the tower which is spread out over the entire cross-sectional area, the entire volume of the tower is utilized for the liquid-vapor contacting action.

It has been found desirable to eliminate completely the bubbling of the vapor through any layer of liquid because the hydrostatic head of the liquid layer impedes the free flow of the vapor and is liable to cause surging and/or entrainment of liquid particles on the vapor stream by reason of the violent boiling action engendered. Therefore, flat or corrugated perforated sieve trays in which the liquid covers the perforations are not suited for the type of liquid-vapor contacting contemplated by the present invention.

Previous systems have endeavored to employ the present type of contacting trays designed to swirl the vapor laterally of the column at velocities sufficient to entrain the drops of liquid. This lateral action is unsuited to present purposes which envisions substantially vertical countercurrent. Such even distribution is obtained in present apparatus by means of alternating vapor risers and liquid downcomers equally spaced over the trays and arranged to direct upward streams of vapor against falling streams of liquid and thus provide maximum scrubbing action without interruption of the countercurrent flow.

It is therefore a principal object of the invention to provide means for effecting a steady, true countercurrent flow of vapor and liquid in such a manner as to present large surface areas of contact across which the vapor naturally will pass with a scrubbing action for maximum absorption or cooling effect.

Another object of my invention is to provide a vapor-liquid contacting apparatus having spaced trays formed to effect an evenly distributed and unimpeded countercurrent flow of vapor and liquid through the trays over their entire area and throughout the entire volume of space above, below and within the trays.

A further object of the invention is to provide an apparatus including trays of the nature above described which have a tray efficiently equal to or better than that obtained by bubble or sieve-type trays due to the full utilization of the entire volume of the tower for the contacting action.

A still further object of my invention is to provide a vapor-liquid contacting tray as described above which uses a minimum of materials and which is simple and inexpensive to manufacture, install and maintain.

Other objects and features of advantage will appear as the specification proceeds, and the new and useful features will be fully defined in the claim attached hereto.

The preferred form of my invention is illustrated in the accompanying drawing, forming part of this application, in which:

FIGURE 1 is a fragmentary vertical cross-sectional view of a vapor-liquid contacting apparatus constructed in accordance with the present invention;

FIGURE 2 is an enlarged fragmentary detail view of the configuration of a tray forming part of the apparatus of FIGURE 1;

FIGURE 3 is a plan sectional view on a reduced scale of one form of the tray and is taken substantially on the plane of line 3—3 of FIGURE 2; and FIGURE 4 is a fragmentary plan view of an alternate form of tray.

The vapor-liquid contacting apparatus of the present invention includes a vertical cylindrical tower 11 having means 12 for effecting a controlled upward flow of vapor through the tower, and means 13 for introducing a controlled flow of liquid into the upper end of the tower. Mounted horizontally across the interior of the tower 11 are a plurality of vertically spaced trays 14 which partition the tower into separate chambers 16.

Each of the trays 14 consists of a plate having alternate raised and depressed portions 17 and 18 connected by upright walls 19 to provide adjacent vapor risers 21 and liquid downcomers 22.

The vapor risers 21 are formed with a series of perforations 23 in their upper ends and the liquid downcomers 22 have a corresponding series of perforations 24 in their lower ends. The upright walls 19 are imperforate between the perforations 23a and 24a.

The raised and depressed portions 17 and 18, and the perforations 23 and 24 thereat, are spaced vertically apart by a distance sufficient to permit liquid to pass downwardly through the downcomers 22 under the influence of a head of liquid collected in the downcomers. The liquid only partially fills the downcomers to the level indicated at 26, leaving the vapor free to pass upwardly through the perforations 23 in the vapor risers unimpeded by any layer of liquid.

Preferably, the raised and depressed portions 17 and 18 are flat and the walls 19 substantially vertical, as illustrated in the drawing, in order that the perforations 23 and 24 will cover substantially the entire horizontal area of the tray. Also, the risers 21 and the downcomers 22 in each tray should be offset with respect to those in adjacent trays and the perforations arranged so that each stream of vapor rising through the perforations 23 will impinge and scrub against the stream of droplets falling from the perforations 24 in the next tray above. Thus, a uniform distribution of the countercurrents will be obtained over the horizontal area of the trays and chambers 16 therebetween.

As a feature of the present invention, the perforations 23 are arranged to project streams of vapor into the area beneath the liquid downcomers 21 in the next tray above, and the perforations 24 are arranged to shower liquid into the area overlying the vapor risers 22 in the next tray below. This will further evenly distribute the countercurrently flowing streams throughout the area and insure even more thorough contact.

Such projection of the streams of vapor and liquid is accomplished by forming lateral perforations 23a in the walls 19 adjacent to the flat portion 17, and by forming similar lateral perforations 24a in the walls 19 adjacent to the flat portions 18 and beneath the liquid level 26. As shown by the arrows 27 and 28 in FIGURE 2, the streams of vapor and liquid respectively will be thus projected into the desired scrubbing contact with the countercurrent streams.

The tray may be formed in any suitable configuration which will provide the alternate flat raised and depressed portions 17 and 18 connected by imperforate vertical walls 19 of suitable height. For example, as shown in FIGURE 3, the tray may be formed with alternate flat topped ridges 31 and flat bottomed valleys 32. Such ridges and valleys may be formed transversely of the plate, as shown, or may be concentric or staggered in different sections of the plate.

Another form of the tray is shown in FIGURE 4 wherein a plurality of evenly spaced inverted cup-like protrusions 36 are formed in the plate to provide the vapor risers and the normal level of the plate acts as the depressed liquid downcomers. This form of plate could be inverted and still function, but it is preferred to be used in the position shown so that the liquid will be free to spread out evenly and thus aid in maintaining the liquid level above the perforations 24a but below the perforations 23a.

In operation, vapor or gas is introduced into the tower through the means 12 and, by reason of a pressure drop across the height of the tower, is caused to flow upwardly therethrough. As the vapor passes through the perforations 23 and 23a, in the vapor risers 21 of each tray, it is split up into a myriad of evenly distributed streams.

The liquid is introduced into the upper end of the tower through means 13 and is showered down onto the first tray where it collects in the liquid downcomers 22. As a head of liquid collects above the perforations 24 and 24a, the liquid is forced downwardly through the perforations against the upward pressure of the vapor.

It is noted that, since the vapor is free to rise through the perforations 23 in the vapor risers, no bubbling action in the downcomers occurs, and the liquid is showered downwardly toward the next tray in evenly distributed streams.

Because of the arrangement of the vapor risers and liquid downcomers and their respective perforations, the upwardly flowing streams of vapor impinge on and scrub against the descending drops throughout the entire area above, below and within the trays. Thus, the entire volumetric area of the tower is efficiently used and maximum vapor-liquid contact is obtained.

Control of the amount of liquid flow, in relation to the vapor flow and the area, number and size of the perforations to maintain the desired liquid level 26 on the trays, is made simpler by the provision of a considerable extent of imperforate vertical wall area, which, because it contains no perforations, allows considerable leeway in the depth of liquid in the downcomers without danger of covering the vapor perforations 24 and resultant objectionable bubbling.

From the foregoing, it will be seen that the gas or vapor to liquid contacting apparatus of the present invention accomplishes a novel countercurrent flow of vapor and liquid within the tower resulting in improved volumetric and tray efficiency.

It is apparent, of course, that certain modifications may be made to the apparatus shown and, accordingly, it is not wished to limit the invention to the particular form shown except as may be set forth in the claim.

What is claimed is:

A bubble tray for a liquid vapor contact apparatus comprising a plate having alternate upper horizontal perforated portions and lower horizontal perforated portions, said upper portions forming vapor risers through which vapors pass unimpeded, vertical walls connecting the perimeter of said upper portions to the perimeter of said lower portions to form liquid downcomers for holding a column of liquid therein, said walls having a row of apertures disposed in the bottom thereof to direct a discharge of liquid in a horizontal direction across the flow path of any vapor moving upwardly toward said risers, said walls having another row of apertures disposed in the top thereof to direct vapor across the top of said downcomer, the upright walls having continuous imperforate intermediate sections between the upper and lower rows of apertures, the imperforate sections constituting the major portions of said upright walls.

References Cited in the file of this patent

UNITED STATES PATENTS

| | | |
|---|---|---|
| 211,519 | Murphy | Jan. 21, 1879 |
| 2,767,966 | Chave | Oct. 23, 1956 |
| 2,767,967 | Hutchinson | Oct. 23, 1956 |
| 2,803,528 | Erdmann | Aug. 20, 1957 |

FOREIGN PATENTS

| | | |
|---|---|---|
| 16.067 | Austria | Apr. 25, 1904 |
| 633,433 | Germany | July 27, 1936 |
| 765,623 | Great Britain | Jan. 9, 1957 |